United States Patent
Fugett et al.

(10) Patent No.: US 12,185,664 B2
(45) Date of Patent: Jan. 7, 2025

(54) TURF STRIPING APPARATUS FOR USE WITH LAWN VEHICLE

(71) Applicant: EXMARK MANUFACTURING COMPANY, INCORPORATED, Beatrice, NE (US)

(72) Inventors: Frederick Aubrey Fugett, Hallam, NE (US); Aleksandr A. Nurbabayev, Lincoln, NE (US)

(73) Assignee: EXMARK MANUFACTURING COMPANY INCORPORATED, Beatrice, NE (US)

( * ) Notice: Subject to any disclaimer, the term of this patent is extended or adjusted under 35 U.S.C. 154(b) by 825 days.

(21) Appl. No.: 17/316,882

(22) Filed: May 11, 2021

(65) Prior Publication Data
US 2022/0361402 A1   Nov. 17, 2022

(51) Int. Cl.
| | |
|---|---|
| A01D 34/81 | (2006.01) |
| A01B 45/00 | (2006.01) |
| A01D 43/10 | (2006.01) |
| A01D 101/00 | (2006.01) |

(52) U.S. Cl.
CPC .............. *A01D 34/81* (2013.01); *A01B 45/00* (2013.01); *A01D 43/10* (2013.01); *A01D 2101/00* (2013.01)

(58) Field of Classification Search
CPC .... A01D 34/81; A01D 43/10; A01D 2101/00; A01B 45/00
See application file for complete search history.

(56) References Cited

U.S. PATENT DOCUMENTS

| | | | | |
|---|---|---|---|---|
| 2,815,524 A | * | 12/1957 | Orville | A01B 29/06 |
| | | | | 15/256.51 |
| 2,973,613 A | * | 3/1961 | Hagedorn | F16P 3/08 |
| | | | | D15/17 |
| 3,126,689 A | | 3/1964 | Walker et al. | |
| 3,190,061 A | * | 6/1965 | Gilbertson | A01D 34/828 |
| | | | | 56/10.5 |
| 3,226,920 A | * | 1/1966 | Gilbertson | A01D 75/20 |
| | | | | D15/17 |
| 3,306,015 A | * | 2/1967 | Myers | A01D 34/42 |
| | | | | 15/82 |
| 3,378,995 A | * | 4/1968 | Welsh | A01D 34/828 |
| | | | | 56/320.1 |

(Continued)

FOREIGN PATENT DOCUMENTS

WO   2020/067953   4/2020

OTHER PUBLICATIONS

Dixie Chopper, "How to Stripe Your Lawn", https://www.youtube.com/watch?v=ejVOI00p_VE, Jul. 5, 2018, 1 page.

(Continued)

*Primary Examiner* — Arpad Fabian-Kovacs
(74) *Attorney, Agent, or Firm* — Mueting Raasch Group (57) ABSTRACT

A turf striping apparatus is disclosed. A wiper has a proximal end and a distal end. The wiper defines an elongate loop about a central opening. The elongate loop defines a convex turf contact surface on the distal end having a radius of curvature of at least 0.5 inches. The wiper has a fastening structure towards the proximal end of the wiper configured to be fastened to a working implement.

16 Claims, 5 Drawing Sheets

(56) References Cited

U.S. PATENT DOCUMENTS

| | | | | |
|---|---|---|---|---|
| 3,555,793 | A | * | 1/1971 | Chapman ............ A01D 34/828 56/17.4 |
| 3,650,543 | A | * | 3/1972 | Evans .................. B62D 25/188 248/316.6 |
| 3,727,386 | A | | 4/1973 | Jespersen et al. |
| 3,808,739 | A | * | 5/1974 | Newgent ................ E01H 1/108 404/101 |
| D244,191 | S | * | 5/1977 | Diehl ............................ D15/28 |
| 4,030,277 | A | | 6/1977 | Christopherson |
| 5,447,021 | A | * | 9/1995 | Plamper ................. A01D 75/20 56/320.1 |
| 5,761,894 | A | | 6/1998 | Evans |
| 6,207,092 | B1 | * | 3/2001 | Kulkaski ............... B29C 48/08 264/173.17 |
| 6,832,468 | B2 | | 12/2004 | Weinlader |
| 7,024,845 | B2 | | 4/2006 | Kallevig |
| 7,373,768 | B2 | | 5/2008 | Sugden et al. |
| 8,522,518 | B2 | * | 9/2013 | Hirose ................. A01D 34/828 56/320.1 |
| 9,545,050 | B2 | * | 1/2017 | Fichera ................ A01D 34/001 |
| 10,375,886 | B2 | * | 8/2019 | Hine ...................... A01D 34/54 |
| 10,850,759 | B2 | * | 12/2020 | Loveless ............... B62B 5/0006 |
| 2003/0230067 | A1 | * | 12/2003 | Weinlader ............. A01D 43/00 56/320.1 |
| 2005/0268586 | A1 | * | 12/2005 | Kallevig ................ A01D 43/00 56/1 |

OTHER PUBLICATIONS

Exmark Manufacturing Company, Inc. pamphlet, "Viking Parts Manual Model No. VHS481GKA36200—Serial No. 406294345 and Up" copyright 2019, 36 pages.

Exmark Manufacturing Company, Inc. info sheet, "Turf Striper Kit, Kit No. 126-7882", believed to be available at least as early as Oct. 22, 2020, 2 pages.

John Deere, "Stripe Kit, BTC10285, BTC10286, BTC10287, Installation Instructions ZTrak Mower Z900 Series", Apr. 1, 2013, 8 pages.

Power Mower Sales, Dixie Chopper Parts Distributors, "300329 Dixie Chopper Zebra Kit LT 50"/60"", retrieved from the internet, https://www.dixiechopperpartsdistributors.com/dixiechopper-300329, believed to be available at least as early as Oct. 22, 2020, 4 pages.

* cited by examiner

TURF STRIPING APPARATUS FOR USE WITH LAWN VEHICLE

BACKGROUND

Grass or turf striping is a grooming procedure used to orient grass to achieve a particular aesthetic effect. For example, striping is commonly used in professional ballparks to create a turf surface having a checkerboard or plaid pattern. Today, golf courses, municipal parks, and, to a lesser extent, homeowners, seeking to obtain a more manicured and professional lawn appearance are also incorporating striping techniques into their lawn care procedures.

In general, the striping effect may be achieved by bending blades of grass in controlled directions. An area of grass bent away from an observer, for example, may appear lighter than an area bent towards the observer. Often, a first strip of grass is bent in a first direction, while the immediately adjacent strip is bent in the opposite direction. This pattern may be repeated across an entire turf surface to achieve the desired effect.

Striping may typically be accomplished by rolling the grass, often in conjunction with a mowing operation. That is, a roller may be attached to a rear portion of a mowing vehicle to roll over and bend the grass in the direction of vehicle travel. Professional reel mowers, for example, may include a roller fixed to a rear side of each mower reel. Other mower configurations, e.g., riding rotary mowers, may include full width, rear-mounted rollers.

While these striping systems are effective, problems remain. For example, rollers are often heavy and/or rigidly fixed to the mower or cutting deck to ensure sufficient downward force is applied to produce the desired striping effect. However, heavy or full-width rollers, or those rigidly affixed to the vehicle, may strike ground surfaces or obstacles, e.g., curbs, during operation, resulting in potential damage to the turf surface and/or the roller. Existing striping systems can be relatively large. Moreover, current striping mechanisms may catch or snag on material or components while moving across the ground or being transported.

SUMMARY

Some embodiments of the technology disclosed herein relate to a turf striping apparatus having a wiper having a proximal end and a distal end. The wiper defines an elongate loop about a central opening. The loop defines a convex turf contact surface on the distal end having a radius of curvature of at least 0.5 inches. The wiper has a fastening structure towards the proximal end of the wiper configured to be fastened to a working implement.

In some such embodiments, the fastening structure is configured to form a non-pivotable connection between the wiper and the working implement. Additionally or alternatively, the wiper has an elongate sheet having a first elongate end and a second elongate end, where the elongate sheet forms a bend between the first elongate end and the second elongate end, and the bend defines the convex turf contact surface. Additionally or alternatively, the wiper defines a closed loop. Additionally or alternatively, the first elongate end and the second elongate end of the elongate sheet form the proximal end of the wiper. Additionally or alternatively, the first elongate end abuts the second elongate end.

Additionally or alternatively, the wiper defines a plurality of slits through the distal end towards the proximal end, where the plurality of slits are spaced along the wiper in the longitudinal direction. Additionally or alternatively, the plurality of slits are equally spaced in the longitudinal direction. Additionally or alternatively, each slit within the plurality of slits is spaced at least 3 inches from adjacent slits within the plurality of slits. Additionally or alternatively, the fastening structure has a plurality of fastener openings spaced across the proximal end of the wiper.

Additionally or alternatively, the fastening structure has a rigid attachment plate having plate openings configured to be longitudinally aligned with the fastener openings, where each of the plate openings have a vertical length that is greater than a vertical length of each of the plurality of fastener openings, whereby the rigid attachment plate is configured to be selectively linearly translated relative to the wiper from a first position to a second position. Additionally or alternatively, the first position is configured to correspond to a first stiffness of the wiper and the second position is configured to correspond to a second stiffness of the wiper that is greater than the first stiffness.

Some embodiments of the technology disclosed herein relate to a turf striping apparatus having a wiper having a proximal end and a distal end, where the wiper defines an elongate loop about a central opening and the loop defines a convex turf contact surface on the distal end. The striping apparatus has a fastening structure towards the proximal end of the wiper that is configured to be fastened to a working implement. The turf striping apparatus defines a pivot axis in the longitudinal direction. The wiper is configured to pivot about the pivot axis. The turf striping apparatus defines a biasing force opposing pivoting of the wiper about the pivot axis.

In some such embodiments, the fastening structure is configured to form a non-pivotable connection between the wiper and the working implement. Additionally or alternatively, the wiper has an elongate sheet having a first elongate end and a second elongate end, where the elongate sheet forms a bend between the first elongate end and the second elongate end, and the bend defines the convex turf contact surface. Additionally or alternatively, the convex turf contact surface has a radius of curvature of at least 0.5 inches.

Additionally or alternatively, the first elongate end and the second elongate end of the elongate sheet form the proximal end of the wiper. Additionally or alternatively, the first elongate end abuts the second elongate end. Additionally or alternatively, the wiper defines a plurality of slits through the distal end towards the proximal end, where the plurality of slits are spaced along the wiper in the longitudinal direction. Additionally or alternatively, the fastening structure defines the pivot axis and the wiper defines the biasing force. Additionally or alternatively, the fastening structure defines the pivot axis and the biasing force. Additionally or alternatively, the fastening structure has a plurality of fastener openings spaced across the proximal end of the wiper.

Additionally or alternatively, the wiper has a rigid attachment plate having plate openings configured to be longitudinally aligned with the fastener openings. Each of the plate openings have a vertical length that is greater than a vertical length of each of the plurality of fastener openings, whereby the rigid attachment plate is configured to be selectively linearly translated relative to the wiper from a first position to a second position. Additionally or alternatively, the first position is configured to correspond to a first stiffness of the wiper and the second position is configured to correspond to a second stiffness of the wiper that is greater than the first stiffness.

Some embodiments relate to a turf vehicle. The turf vehicle has a working implement configured to be supported in a position above a turf surface, the working implement having an implement tool. A turf striping apparatus is coupled to the working implement. The turf striping apparatus has a wiper extending across the working implement in a trailing position relative to the implement tool. The wiper defines an elongate loop about a central opening, a proximal end, and a distal end forming a convex turf contact surface. The striping apparatus has a fastening structure towards the proximal end of the wiper that fastens the implement and the wiper. The turf striping apparatus defines a pivot axis in the longitudinal direction between the wiper and the working implement. The turf striping apparatus defines a biasing force opposing pivoting of the wiper about the pivot axis.

In some such embodiments, the wiper has an elongate sheet having a first elongate end and a second elongate end. The elongate sheet forms a bend between the first elongate end and the second elongate end, and the bend defines the convex turf contact surface. Additionally or alternatively, the wiper defines one or more slits extending from the distal end toward the proximal end, whereby the wiper is segmented into two or more longitudinal sections in the longitudinal direction. Additionally or alternatively, the convex turf contact surface has a radius of curvature of 1 inch to 2 inches. Additionally or alternatively, the turf contact surface extends more than 200 degrees about a striper axis of the turf striping apparatus. Additionally or alternatively, the working implement has a cutting deck. Additionally or alternatively, the fastening structure has an attachment plate configured to secure the wiper to the implement, where the attachment plate may be linearly translated from a first position, corresponding to a first stiffness of the wiper, to a second position corresponding to a second stiffness of the wiper that is greater than the first stiffness.

Some embodiments relate to a lawn mower. The lawn mower has a vehicle frame, a cutting deck, and a turf striping apparatus. The cutting deck is supported by the vehicle frame in a position above a turf surface. The cutting deck has one or more cutting blades. The turf striping apparatus is coupled to the cutting deck. The turf striping apparatus has a wiper in a trailing position relative to the one or more cutting blades. The wiper defines an elongate loop about a central opening having a central axis, a proximal end coupled to the cutting deck, and a distal end forming a convex turf contact surface. The convex turf contact surface has a radius of curvature of at least 0.5 inches for at least 180 degrees about the central axis. The striping apparatus has a fastening structure towards the proximal end of the wiper that non-pivotably fastens the wiper to the cutting deck. The fastening structure has an attachment plate extending across a portion of the wiper, where the attachment plate is configured to be linearly translated from a first position, corresponding to a first stiffness of the wiper, to a second position corresponding to a second stiffness of the wiper that is greater than the first stiffness.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. The term "i.e." is used as an abbreviation for the Latin phrase id est and means "that is." The term "e.g." is used as an abbreviation for the Latin phrase exempli gratia and means "for example."

It is noted that the terms "have," "include," "comprise," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the lawn vehicle 100 is in an operating configuration (e.g., while the lawn vehicle 100 is positioned such that wheels 106 and 108 rest upon a generally horizontal ground surface 50 as shown in FIG. 1).

These terms are used only to simplify the description, however, and not to limit the interpretation of any embodiment described.

The current disclosure is generally directed to a turf striping apparatus for a lawn vehicle. While the general construction of the lawn vehicle 100, which is a lawn mower 100 in the current example, is not necessarily central to an understanding of exemplary embodiments (e.g., other mower and other vehicle configurations are certainly contemplated), the general construction of the lawn mower 100 is briefly described below.

Figure 1:
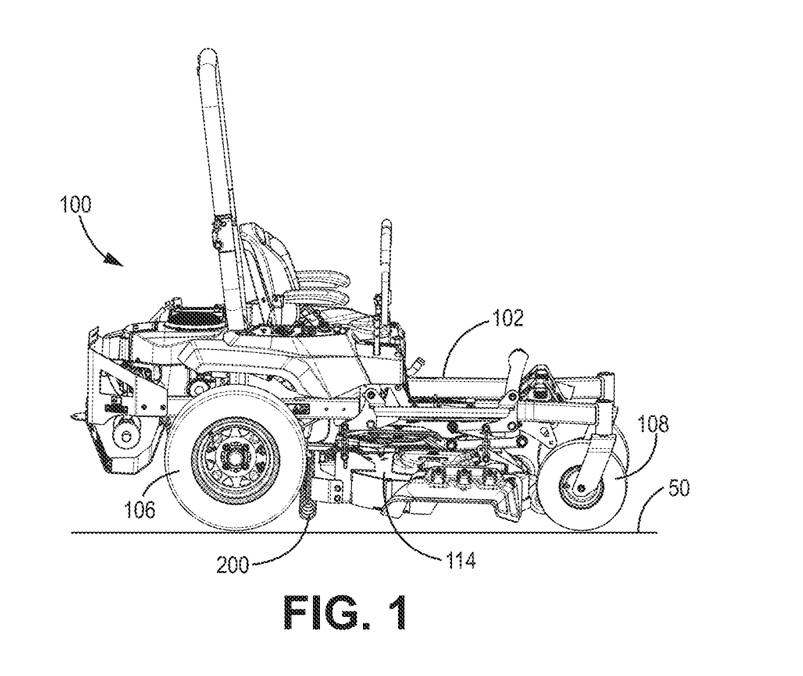
FIG. 1 is a side view of an example implementation of the technology disclosed herein in a lawn vehicle.

With reference to the figures of the drawing, wherein like reference numerals designate like parts and assemblies throughout the several views, FIG. 1 is a perspective view of an example lawn mower 100 that is configured to mow a ground or turf surface 50. The lawn mower 100 has a working implement 114 configured to be supported in a position above the turf surface 50. The working implement 114 has an implement tool 112 configured to perform a maintenance operation on the turf surface 50. In the current example the working implement 114 is a cutting deck 114 and the implement tool 112 is one or more cutting blades 112 that are configured to cut grass over which the deck passes and a turf striping apparatus 200 configured to stripe the turf surface 50 as further described below.

The mower generally has a frame 102 supporting a prime mover, e.g., internal combustion engine. The frame 102 is also configured to support the working implement 114 in various examples. A left and a right ground engaging drive wheel 106 (only right wheel shown) may be rotatably coupled to left and right sides of a rear portion of the lawn mower 100, respectively. The drive wheels 106 may be independently powered by the engine (e.g., via one or more hydraulic motors, transmissions, or the equivalent) so that they may propel the mower 100 over the turf surface 50 and control the mower's direction.

In the current example, the lawn mower 100 can have a pair of front swiveling caster wheels 108 connected to the frame 102 to support a front portion of the mower 100 in rolling engagement with the turf surface 50.

Although the illustrated mower has the drive wheels 106 in the rear, this configuration is not limiting. For example, other embodiments may reverse the location of the wheels, e.g., drive wheels in front and caster wheels in back. Moreover, other configurations may use different wheel configurations altogether, e.g., a tri-wheel configuration or a conventional front-wheel-steering configuration. Accordingly, other embodiments are possible without departing from the scope of the invention.

While the current example depicts a riding mower, the lawn mower 100 can be consistent with walk-behind mowers, towed and gang mowers, etc., and to other vehicles to which a cutting deck 114 is attached, such as all-terrain vehicles and skid-steer loaders. In some other examples, the vehicle may omit the cutting deck 114.

Figure 2:
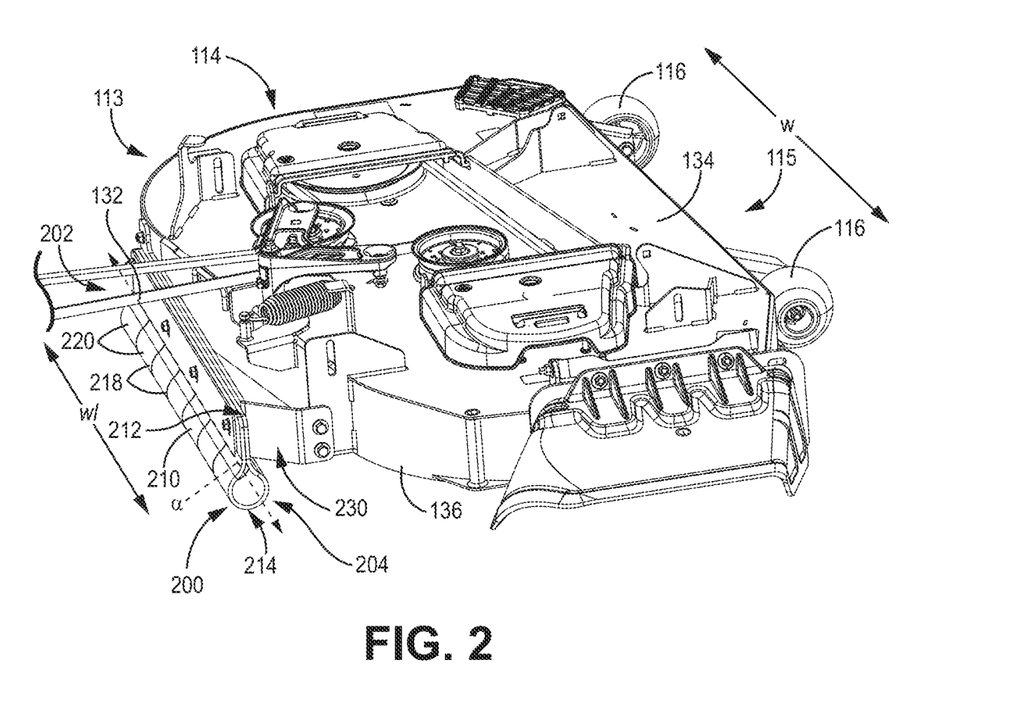
FIG. 2 is a first perspective view of an example implementation of the technology disclosed herein in a ground implement of a lawn vehicle.
Figure 3:
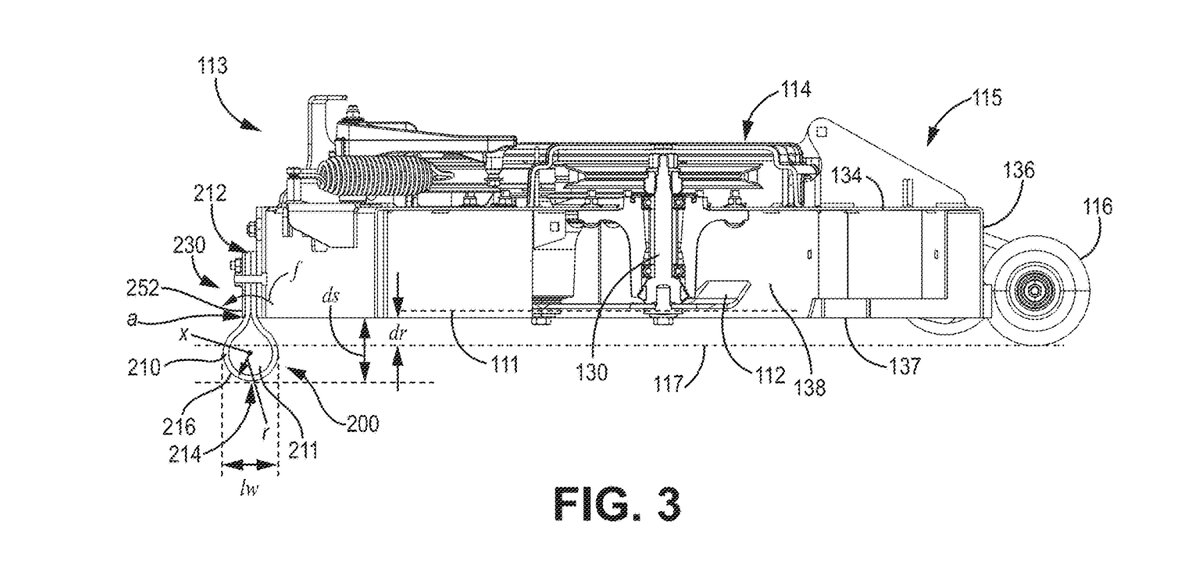
FIG. 3 is a cross-sectional view of the example implementation depicted in FIG. 2.

In the current example, the lawn mower 100 has a cutting deck 114 that is mounted to the lower side of the frame 102. The cutting deck 114 is positioned between the drive wheels 106 and the caster wheels 108. FIGS. 2 and 3 depict a particular example of a cutting deck 114 that can be consistent with the lawn mower 100 depicted in FIG. 1, where FIG. 2 is a perspective view and FIG. 3 is a cross sectional view. The cutting deck 114 generally has a front end 115 and a rear end 113. The front end 115 forms a leading portion of the cutting deck 114 and a rear end 113 forms a trailing portion of the cutting deck 114 during normal, forward operation of the vehicle.

The cutting deck 114 forms a cutting chamber 138 defined by an upper surface 134 and one or more sidewalls 136 extending downwardly from the upper surface 134 about the cutting chamber 138. The one or more sidewalls 136 and the upper surface 134 define the cutting chamber 138. The cutting chamber 138 has a chamber opening 137 facing the turf surface 50. The chamber opening 137 defines a chamber opening plane (also denoted by element 137) that is configured to be spaced from the turf surface.

As particularly visible in FIG. 3, the cutting deck 114 has one or more cutting blades 112 that are operatively powered by the engine. Each cutting blade 112 is configured to rotate within a cutting chamber 138 and sever grass. Each cutting blade 112 accesses the grass through the chamber opening 137. The cutting blades 112 cumulatively define a cutting plane 111 which defines the height at which the grass is severed. In various embodiments, the cutting plane 111 is adjustable by a user. The cutting plane 111 is generally defined between the upper sidewall and the turf surface 50.

The cutting deck 114 has one or more spindles 130, each driving a separate cutting blade 112. The spindles 130 are configured to receive power from the engine. The spindles 130 can be configured to receive power from the engine via one or more endless belts 132 (partially visible in FIG. 2).

In various embodiments, including the example depicted, the cutting deck 114 has deck rollers 116 (e.g., anti-scalp rollers) to obstruct contact between the cutting deck 114 and the ground surface 50 to reduce and/or prevent scalping of the ground surface 50 (or damage to the implement 114) as the implement 114 traverses the ground surface 50. Generally the deck rollers 116 are configured to be suspended about the ground surface 50 but may make contact with the ground when traversing uneven terrain. The deck rollers 116 are configured to define a minimum vertical space between the cutting chamber plane 137 and the ground surface 50. The deck rollers 116 cumulatively define a roller plane 117. The roller plane 117 can be parallel to the chamber opening plane 137, in some embodiments. In some embodiments the roller plane 117 is parallel to the cutting plane 111. The roller plane 117 is configured to be vertically below the cutting plane 111 and the chamber opening plane 137 across the implement 114.

The striping apparatus 200 is configured to be coupled to the working implement (cutting deck) 114 in a position trailing the implement tool 112. The striping apparatus 200 is generally configured to wipe across the turf to bend the blades of grass in its path as the cutting deck traverses the turf surface 50. The striping apparatus is configured to bend the blades of grass after the cutting operation by the cutting blades 112. To generate a striped appearance in a lawn, the lawn mower 100 may traverse the turf surface 50 in an alternating pattern. For example, the lawn mower 100 can travel along a first path in a first direction, and then the mower is turned to travel along a second path in the reverse direction, where the second path is parallel to and adjacent the first path. As such, grass within the first path is bent one way by the striping apparatus 200 and grass within the second path is bent the opposite way by the striping apparatus 200. This pattern may be repeated across the turf surface 50 to produce the alternating stripes.

The turf striping apparatus 200 generally has a wiper 210 extending from a proximal end 212 to a distal end 214. The striping apparatus 200 is configured to be coupled to the cutting deck 114 towards the proximal end 212. Towards the distal end 214, the striping apparatus 200 is configured to drag across blades of grass. As such, when the turf striping apparatus 200 is coupled to the working implement, the turf striping apparatus is configured to hang vertically from the proximal end 212 to the distal end 214. In particular, the distal end 214 forms a turf contact surface 216 that is configured to drag across the turf surface 50.

In various embodiments, the striping apparatus 200 defines a pivot axis a. The pivot axis a generally extends in the longitudinal direction along the length of the wiper 210. The wiper 210 is generally configured to pivot about the pivot axis a as the wiper 210 is dragged across the turf surface 50. The wiper 210 can be configured to pivot rearward about the pivot axis a as the wiper 210 is dragged across the turf surface 50 driven by the frictional engagement between the turf surface 50 and the wiper 210. However, in various embodiments, the striping apparatus 200 defines a biasing force f that opposes pivoting of the wiper 210 about the pivot axis a. The biasing force f can particularly oppose the rearward pivoting of the wiper 210 about the pivot axis a. Such a biasing force may advantageously be transmitted to the turf surface 50 to bend the blades of grass across which the wiper 210 is dragged. It is noted that, for purposes of the present disclosure, gravitational force is excluded from the definition of the biasing force f defined by the striping apparatus.

Figure 4:
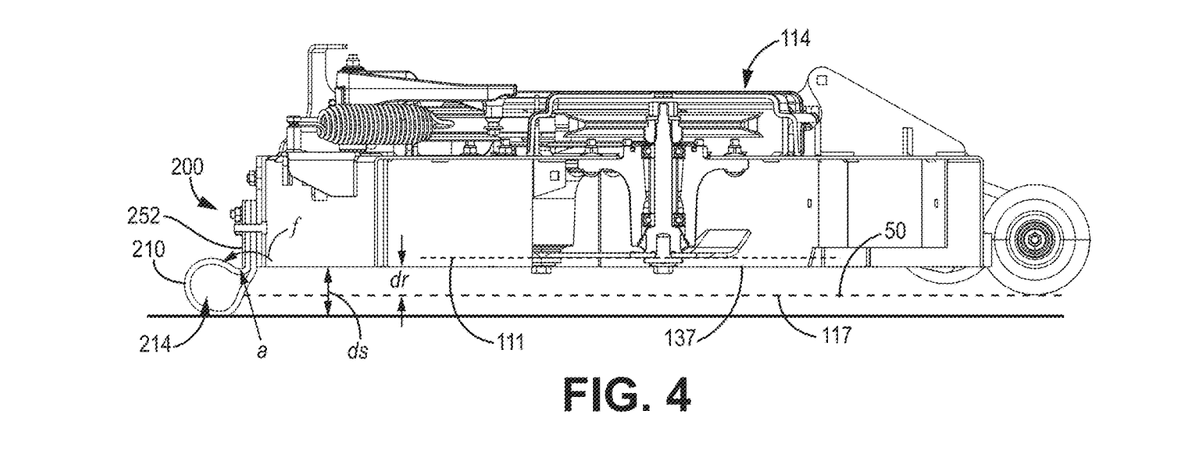
FIG. 4 is a cross-sectional view of the example implementation depicted in FIG. 2 in an example operation.

In some examples, the wiper 210 can be constructed of a relatively flexible material that allows the distal end of the striping apparatus 200 to pivot about the pivot axis a as it is dragged across the ground surface, which is particularly visible in FIG. 4. Furthermore, the wiper 210 can be constructed of a relatively resilient material that (at least in part) defines the biasing force f that opposes the pivoting of the wiper 210. The term "flexible," as used herein, indicates a relatively elastic material that can undergo substantial deflection, e.g., experience strain in excess of about 15%, and more preferably in excess of about 25%, without experiencing failure or substantial permanent set. For example, the wiper 210 is constructed of a polymeric material in various embodiments. In some embodiments the wiper 210 is constructed of an elastomeric material. Some materials that provide appropriate flexibility may be selected from the group consisting of rubber and plastic. Alternative materials may include fabrics and foams. Flexibility of the wiper 210 allows adequate and consistent contact with the ground surface 50 while reducing potential damage to the turf and/or the striping apparatus 200 as a result of wiper/turf contact.

The wiper 210 is configured to extend across the implement in a trailing position relative to the implement tool 112. The wiper 210 generally extends across at least a portion of a width w of the implement 114. As is visible in FIGS. 1 and 2, in some examples, the wiper 210 is configured to extend across the rear end 113 of the implement 114 in width w direction of the implement 114. In some other embodiments, the wiper 210 is coupled to the implement 114 and extends across the width w of the implement 114 between the front end 115 and the rear end 113 of the implement 114. The wiper 210 is generally elongate and has a longitudinal length wl extending from a first elongate end 202 to a second elongate end 204. The turf contact surface 216 extends from the first elongate end 202 to the second elongate end 204.

The turf contact surface 216 is generally convex in shape (absent interference from external forces) in a plane perpendicular to the longitudinal length of the wiper 210. The turf contact surface 216 extends around a striper axis x (FIG. 3), where the striper axis x extends in the longitudinal direction. The turf contact surface 216 can have a lateral width that varies along its vertical length, but generally, absent interference from external forces (such as the ground surface 50), the turf contact surface 216 has a maximum lateral width lw ranging from 0.75 inches to 5 inches, or 1 inch to 3 inches.

Generally, at least a portion of the turf contact surface 216 has a radius of curvature r (see FIG. 3) about the striper axis x of at least 0.5 inches. In some embodiments, the turf contact surface has a radius of curvature r about the striper axis x from 0.75 inches to 6 inches, or from 1.0 inch to 2.0 inches. In some embodiments, at least a portion of the turf contact surface 216 has a radius of curvature r about the striper axis x of no more than 10.0 inches. The relatively large radius of curvature r may advantageously prevent the wiper 210 from penetrating the ground as it is dragged across the ground surface 50. The relatively large radius of curvature r may advantageously prevent the turf contact surface 216 from catching and dragging debris or snag outside material or components. It is noted that that the radius of curvature r need not be constant around the central axis x.

In some embodiments the radius of curvature r of the turf contact surface 216 is at least 180 degrees about the striper axis x of the turf striping apparatus 200. In some embodiments the radius of curvature r of the turf contact surface 216 extends more than 200 degrees about the striper axis x of the turf striping apparatus 200. In some embodiments the radius of curvature r of the turf contact surface extends between 140 degrees and 360 degrees about the striper axis x of the turf striping apparatus 200.

In the current example, the wiper 210 forms an elongate loop around the striper axis x. More particularly, the wiper 210 forms an elongate loop around a central opening 211. The elongate loop and the central opening 211 extend in the longitudinal direction. The turf contact surface 216 is substantially continuous around the central opening 211, meaning that the turf contact surface 216 does not define a discrete end around the central opening 211. The configuration of the turf contact surface 216 may advantageously reduce the likelihood that the turf contact surface 216 will catch and carry debris or snag outside material or components.

In various embodiments, absent interference from external forces (such as the ground surface 50), the vertical distance ds from the cutting chamber plane 137 to the distal end 214 of the turf striping apparatus 200 is greater than the vertical distance dr between the cutting chamber plane 137 and the roller plane 117, which is depicted in FIG. 3. Further, as depicted in FIG. 4, in the theoretical operation of the lawn vehicle 100 (where the ground surface 50 is perfectly planar), the vertical distance ds from the cutting chamber plane 137 to the distal end 214 of the turf striping apparatus 200 is also greater than the vertical distance dr between the cutting chamber plane 137 and the roller plane 117 (visible in FIG. 4), because the distal end 214 of the turf striping apparatus 200 is in contact with the ground surface 50 and the rollers 116 generally float above the ground surface 50. In various embodiments, the distal end 214 of the turf striping apparatus 200 is configured to be positioned vertically below the cutting plane 111 (see FIGS. 3 and 4).

In some embodiments the wiper 210 of the striping apparatus 200 defines one or more slits 218 extending through the distal end 214 towards the proximal end 212. The plurality of slits segment the wiper 210 into two or more longitudinal sections 220 in the longitudinal direction. The slits 218 are generally configured to accommodate independent pivoting of each of the longitudinal sections 220 of the wiper 210. Such a configuration may advantageously maximize contact of the turf contact surface with the turf along the length of the wiper 210 when the wiper 210 travels over an obstacle (such as a tree root) in the turf.

In various embodiments the slits do not extend through the proximal end 212 of the wiper 210. In some embodiments, the slits extend through both the distal end 214 and the proximal end 212 of the wiper 210. In various embodiments the wiper 210 defines a plurality of slits, where the plurality of slits are spaced along the wiper 210 in the longitudinal direction. In some embodiments the plurality of slits are equally spaced along the wiper 210. In some other embodiments there can be unequal spacing between slits in the plurality slits along the length of the wiper 210. Each slit in the plurality of slits can generally be spaced at least 2 inches from adjacent slits in the plurality of slits. In various embodiments, each slit in the plurality of slits can generally be spaced at least 3 inches from adjacent slits in the plurality of slits. In various embodiments, each slit in the plurality of slits can generally be spaced no more than 20 inches, 15 inches, or 10 inches from adjacent slits in the plurality of slits.

The striping apparatus 200 generally has a fastening structure 230 on its proximal end 212. The fastening structure 230 is generally configured to fasten the proximal end 212 of the striping apparatus 200 to the working implement 114. In this particular example, the fastening structure 230 is configured to form a non-pivotable connection between the wiper 210 and the working implement 114. Such a configuration may advantageously provide a relative increase in the pressure exerted on the ground surface 50 by the wiper 210. In such a configuration, the biasing force f opposing pivoting of the wiper around the pivot axis a and, therefore, the pressure exerted on the ground surface 50 by the wiper 210, is defined by the resiliency of the material forming the wiper 210. In some embodiments the fastening structure 230 incorporates an adjustment mechanism that allows an operator to adjust the flexibility (and, therefore, the biasing force f) of the wiper 210. Example configurations of the fastening structure 230 and an optional adjustment mechanism are described later herein with reference to FIG. 5, which is an exploded view of the implement 114 and an example striping apparatus 200 that are each generally consistent with the previously described figures.

The fastening structure 230 (FIGS. 2-3) can have a variety of configurations and may incorporate various components. Generally, the fastening structure 230 includes a plurality of fastener openings 232 defined by the proximal end 212 of the wiper 210. The fastener openings 232 are each configured to receive a fastener such as a bolt, screw, clamp, or the like. The plurality of fastener openings 232 are spaced in the longitudinal direction across the proximal end 212 of the wiper 210. In some embodiments, the fastener openings 232 are configured to align with corresponding openings defined by the implement 114 such that the wiper 210 is directly coupled to the implement 114. In embodiments consistent with the current example, however, the fastener openings 232 are configured to align with corresponding openings in a frame assembly 240 (see FIG. 5) of the fastening structure 230. The frame assembly 240 is generally configured to couple the wiper 210 to the implement 114. In various embodiments the frame assembly 240 is configured to provide rigidity towards the proximal end 212 of the wiper 210.

In the example shown, the wiper 210 is not directly coupled to the implement 114 to abut the implement 114. Rather, the wiper 210 is directly coupled to and abuts the frame assembly 240, which is configured to be directly coupled to and abut the implement 114. The frame assembly 240 generally has components of the striping apparatus 200 that support the wiper 210 and allow it to couple to the lawn mower 100. For example, the frame assembly 240, in the illustrated embodiments, has a mounting brace 242 and an attachment plate 244 that are configured to cooperatively clamp the proximal end 212 of the wiper 210. The mounting brace 242 and the attachment plate 244 are configured to hold or secure the proximal end 212 of the wiper 210 in place. In various embodiments each of the mounting brace 242 and the attachment plate 244 are rigid to prevent shifting of the wiper 210 relative to the implement 114.

The attachment plate 244 can extend across a portion of the wiper 210. More particularly, in the current example the attachment plate 244 has plate openings 245 configured to be longitudinally and vertically aligned with the fastener openings 232 of the wiper 210. Furthermore, the mounting brace 242 has brace openings 243 that are configured to be longitudinally and vertically aligned with the fastener openings 232 of the wiper 210. The frame assembly 240 can further include fasteners, e.g., carriage bolts 241, that are configured to pass through the aligned plate openings 245, brace openings 243, and the fastener openings 232. Each bolt 241 can be fastened with a nut 246 to clamp the proximal end 212 of the wiper 210 the components relative to one another.

When the wiper 210 is attached to the frame assembly 240 with the bolts 241, the wiper 210 can be held firmly in place along its elongate, proximal end as shown in FIGS. 2-3. The distal end 214 (the end adjacent the turf surface 50), however, remains preferably free (unsupported) and operable to wipe over the turf surface 50. That is, the wiper 210 preferably forms a cantilevered structure fixed towards its proximal end 212.

The frame assembly 240 (e.g., the attachment plate 244, the mounting brace 242 along with the fasteners 241, 246) and wiper 210 together form the striping apparatus 200. To attach the striping apparatus 200 to the lawn mower 100 (e.g., to the cutting deck 114), the frame assembly 240 has mounting brackets 248. In the illustrated embodiments, mounting brace 242 defines the mounting brackets 248 that each define a bracket opening 247 configured to be fixed to aligning openings 249 defined by the implement 114 via mounting fasteners 250.

In various example, the fastening structure 230 (FIG. 3) can have an adjustment mechanism that is configured to allow an operator to adjust the flexibility of the wiper 210. In the current example, the frame assembly 240 and, more particularly, the attachment plate 244 defines at least a portion of the adjustment mechanism. The attachment plate 244 is rigid and is disposed longitudinally across a portion of the length of the wiper 210. The vertical position of the attachment plate 244 is selectively linearly translated relative to the wiper 210 and the mounting brace 242. Referring to FIGS. 3 and 4, the lower edge 252 of the attachment plate 244 defines the pivot axis a (axis visible in FIGS. 2 and 5 and represented by a point in FIGS. 3 and 4) about which the wiper 210 is pivoted when dragged along the ground surface 50. By translating the attachment plate 244 and, therefore, the lower edge 252 and the pivot axis a, vertically downward, the stiffness of the wiper 210 increases, thereby increasing the biasing force f that opposes pivoting of the wiper 210 about the pivot axis a. By translating the attachment plate 244 and, therefore, the lower edge 252 and the pivot axis a vertically upward, the stiffness of the wiper 210 decreases, thereby decreasing the biasing force f that opposes pivoting of the wiper 210 about the pivot axis a.

As an example, referring again to FIG. 5, the plate openings 245 of the attachment plate 244 each have a vertical length l that is greater than a vertical length v of each of the plurality of fastener openings 232 of the wiper 210. Similarly, the plate openings 245 of the attachment plate 244 each have a vertical length l that is greater than a corresponding vertical length of each of the fasteners 241 (bolt). As such, the attachment plate 244 can be linearly translated in the vertical direction relative to the wiper 210 while maintaining the longitudinal position of the attachment plate 244 relative to the wiper 210. In a variety of implementations, to adjust the vertical position of the attachment plate relative to the wiper 210, the fasteners can be loosened (such as by loosening the nut 246 on each of the bolts 241). After loosening the fasteners, the attachment plate 244 can be linearly translated, and the fasteners can then be tightened to secure the attachment plate 244 in the selected vertical position.

Figures 5, 6:
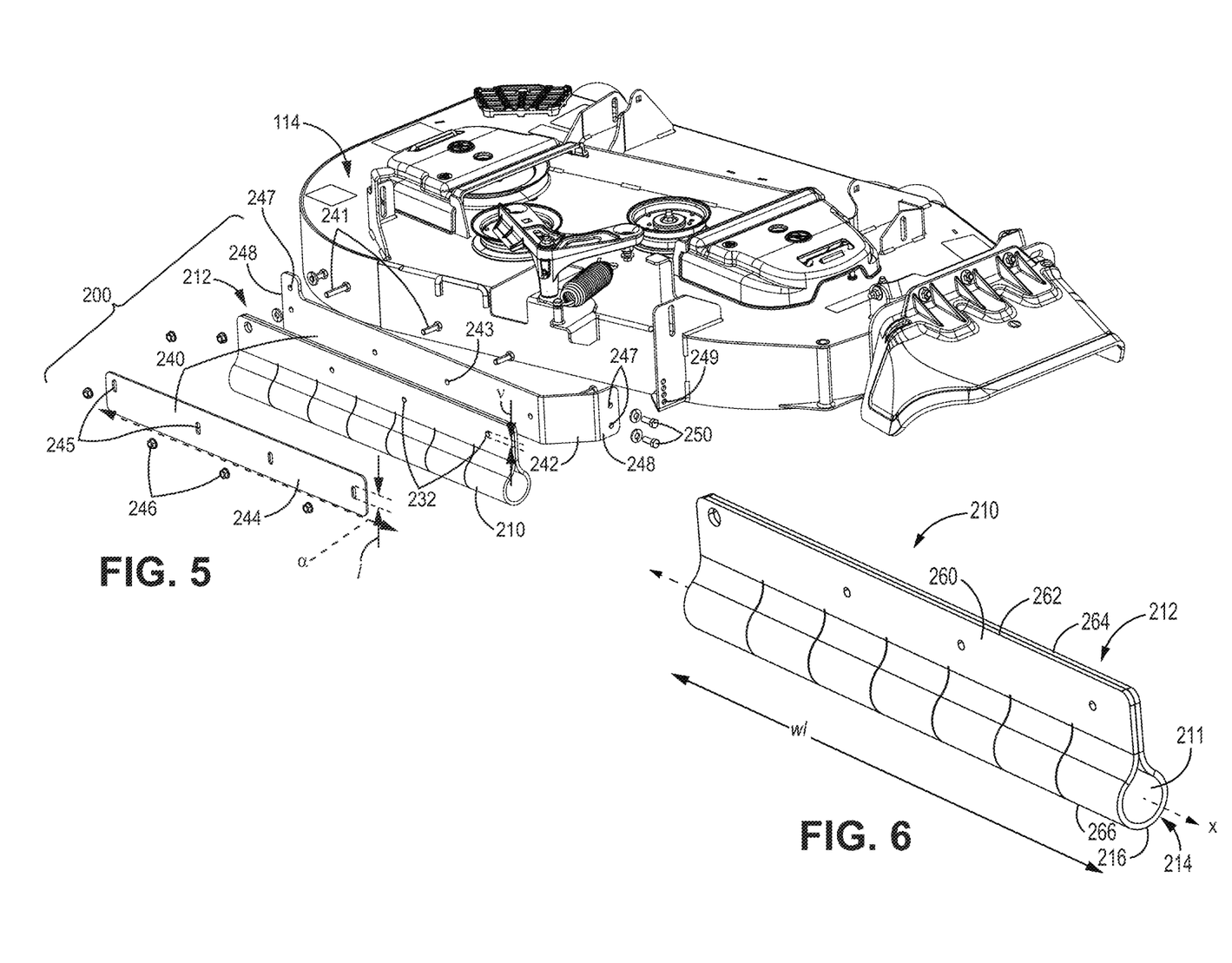
FIG. 5 is an exploded view of the example implementation depicted in FIG. 2.
FIG. 6 is an example wiper consistent with some embodiments.

Wipers consistent with the technology disclosed herein can have a variety of configurations. FIG. 6 is a detail perspective view of a wiper 210 consistent with other illustrations herein. The wiper 210 is generally consistent with the discussions above. In the current example, the wiper 210 is constructed of an elongate sheet 260 defining a first elongate end 262 and a second elongate end 264. The elongate sheet 260 forms a bend 266 between the first elongate end 262 and the second elongate end 264. The bend 266 defines the convex turf contact surface 216.

As discussed above with reference to the wiper 210, the elongate sheet 260 is constructed of a polymeric material, in a variety of embodiments. In a particular example, the elongate sheet 260 is constructed of neoprene. In another example, the elongate sheet 260 is constructed of rubber.

The elongate sheet 260 generally has a longitudinal length w1 configured to extend across the width of the implement tool 112 such that the wiper 210 is configured to wipe the turf surface 50 that has been worked by the implement tool 112. In various embodiments the elongate sheet 260 has a longitudinal length w1 to extend along a substantial portion of the width of the implement. In some embodiments, the elongate sheet 260 has a longitudinal length w1 that exceeds the width of the vehicle between the drive wheels 106. In one particular example, the elongate sheet 260 has a longitudinal length w1 that exceeds the width of the vehicle across the drive wheels 106. The elongate sheet 260 can have a longitudinal length ranging from 12 inches to 36 inches. In some embodiments the elongate sheet 260 can have a longitudinal length ranging from 18 inches to 72 inches. In some embodiments the elongate sheet 260 can have a longitudinal length ranging from 18 inches to 42 inches. In some embodiments the elongate sheet 260 can have a longitudinal length ranging from 26 inches to 30 inches. The elongate sheet 260 can generally have a longitudinal length that is less than 90 inches. The elongate sheet 260 can have a width (which extends in the direction of the lateral length of the wiper 210) ranging from 6 inches to 18 inches, 10 inches to 14 inches, or 11 inches to 13 inches. The elongate sheet 260 can have a thickness ranging from 1/16 to % inches, 1/4 to 5/8 inch, or 1/4 to 5/16 inch.

In the current example, the wiper 210 generally defines a closed loop. Such a configuration advantageously can limit the opportunity for the wiper to collect debris, particularly within the central opening 211. In particular, the first elongate end 262 abuts the second elongate end 264. The bend 266 is formed between the first elongate end 262 and the second elongate end 264 about the central axis x. In some embodiments, the striper 200 defines a closed loop, such as where another component can be disposed between the first elongate end and the second elongate end, such as a component of the fastening structure 230 discussed above. For example, a support plate can be disposed between the first elongate end 262 and the second elongate end 264, where the support plate can have a configuration similar to the attachment plate 244, for example. In some embodiments, the striping apparatus 200 and the working implement 114 (FIGS. 1-5) define a closed loop around the central opening. In the current example, the first elongate end 262 and the second elongate end 264 are substantially coextensive. In some embodiments, the first elongate end and the second elongate end are not coextensive. In some such embodiments, the first elongate end can be vertically above or below the second elongate end.

The first elongate end 262 and the second elongate end 264 of the elongate sheet 260 form the proximal end 212 of the wiper 210. The first elongate end 262 and the second elongate end 264 define a portion of the fastening structure 230 of the striping apparatus 200. In particular, the fastener openings 232 extend through each of the first elongate end 262 and the second elongate end 264. In embodiments where the first elongate end 262 is vertically above or below the second elongate end 264, the fastener openings may be defined by only one of the first elongate end and the second elongate end. The bend 266 defines the distal end 214 of the wiper 210.

In various embodiments, the wiper 210 is formed by obtaining an elongate, flat sheet of material (such as a polymeric material) and folding the material to form the bend 266 and the elongate loop. In some other embodiments, the wiper 210 is formed through a molding and casting process. A mold can define the substantial shape of the wiper, and the wiper material can be cast in the mold and then cured. In yet other embodiments, the wiper 210 can be formed through an extrusion process, where uncured wiper material is extruded through a die and then cured.

While the example striping apparatus 200 is depicted herein as being used with a cutting deck, it will be appreciated that such a striping apparatus 200 can also be used with vehicles that do not incorporate a cutting deck. For example, the striping apparatus 200 can be coupled to the rear end of a vehicle frame, such as between the drive wheels.

Figure 7:
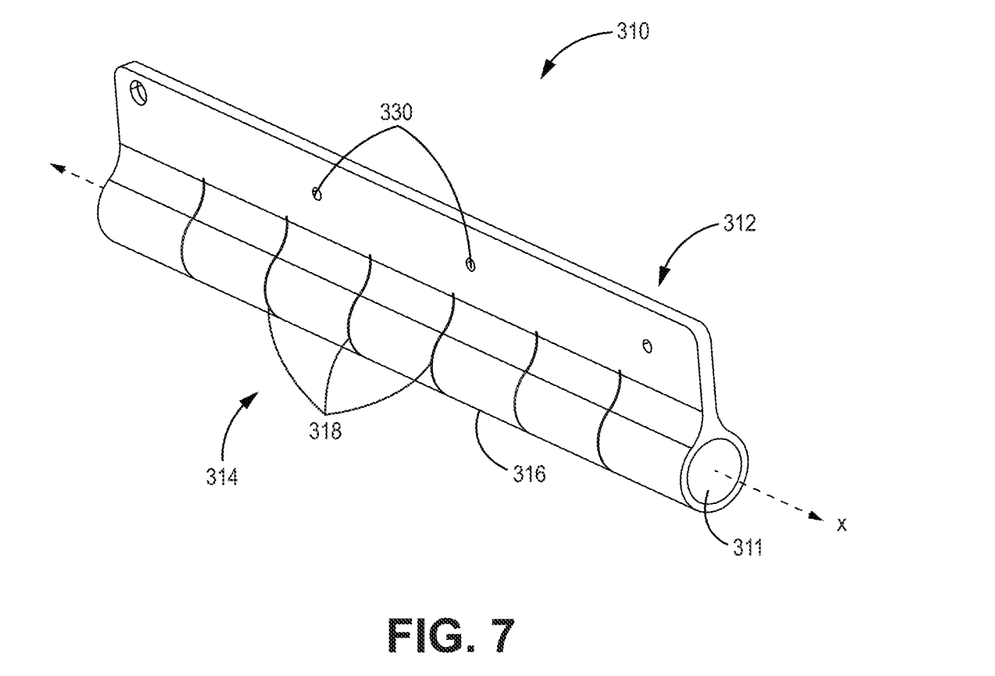
FIG. 7 is another example wiper consistent with some embodiments.

FIG. 7 depicts another example wiper 310 consistent with the technology disclosed herein. The wiper 310 can be formed through an extrusion process, for example. The wiper 310 is generally consistent with the discussion of wipers above, except where inconsistent with the present description. The wiper 310 generally has an elongate shape having a length in the longitudinal direction. The wiper 310 has a proximal end 312 and a distal end 314. The wiper 310 defines an elongate loop about a central opening 311 and the loop defines a convex turf contact surface 316 on the distal end having a radius of curvature of at least 0.5 inches.

The proximal end 312 of the wiper 310 defines a fastening structure 330 that is configured to fastened to a working implement. Similar to examples discussed above, the fastening structure 330 is a series of fastener openings that are configured to be received by fasteners. The fastening structure 330 is configured to non-pivotably fasten the wiper 310 and the working implement.

In the current example, the wiper 310 is not constructed of an elongate sheet having a first elongate end and a second elongate end. Rather, the wiper 310 has an extruded construction where the proximal end 312 is a single unitary portion of material. Similar to embodiments described above, however, the wiper 310 defines a plurality of slits 318 through the distal end 314 towards the proximal end 312. The plurality of slits 318 are spaced along the wiper 310 in the longitudinal direction. The spacing of the slits 318 can be consistent with descriptions above.

The striping device, of which the wiper is a component, can have configurations consistent with striping devices described above.

Figure 8:
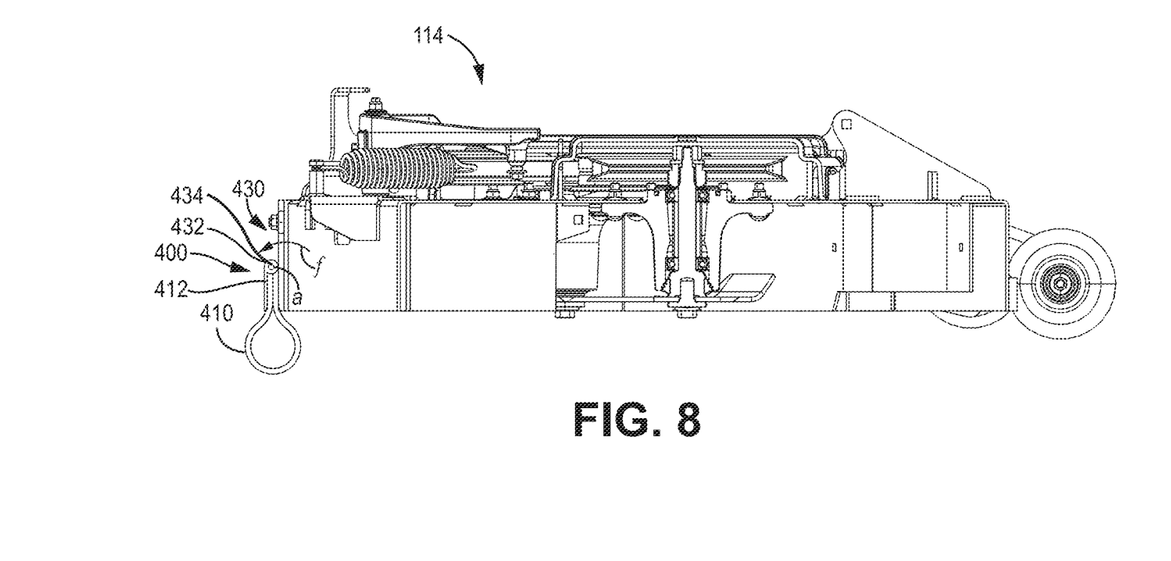
FIG. 8 is a cross-sectional view of another example implementation of the current technology.

FIG. 8 is a cross-sectional view of yet another example implementation of the current technology. The example implementation can be consistent with examples discussed above except where inconsistent with the current description or figure. The striping apparatus 400 has a wiper 410 and a fastening structure 430.

The striping apparatus 400 has the fastening structure 430 on its proximal end 412. The fastening structure 430 is generally configured to fasten the proximal end 412 of the striping apparatus 400 to the working implement 114. In the current example, the fastening structure 430 forms a pivotable connection between the wiper 410 and the implement 114. The fastening structure 430 defines a pivot axis a in the longitudinal direction. The wiper 410 is generally configured to pivot about the pivot axis a during operation of the implement 114. The striping apparatus 400 defines a biasing force f opposing pivoting about the pivot axis a. In particular, in the current example, the fastening structure 430 includes a hinge 432 that defines the pivot axis a between the wiper 410 and the implement 114. The hinge 432 can be coupled to the wiper 410 and the implement 114 through fasteners as is generally known in the art. A torsional spring 434 can be integrated with the hinge 432 and can define the biasing force f opposing pivoting of the wiper 410 about the pivot axis a. The torsional spring 434 can define a biasing force f that particularly opposes rearward pivoting of the wiper 410 about the pivot axis a.

The wiper 410 can generally be consistent with descriptions above. However, in some implementations the wiper 410 need not be constructed of a relatively flexible and/or resilient material because components of the fastening structure 430 (particular to this embodiment, the torsional spring 434) accommodates pivoting of the wiper 410. Further, components of the fastening structure 430 (particular to this embodiment, the torsional spring 434) defines the biasing force that opposes pivoting of the wiper about the pivot axis a. As discussed above, the wiper 410 can be divided into two or more sections in the longitudinal direction.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A turf striping apparatus comprising:
    a wiper having a proximal end and a distal end, wherein the wiper defines an elongate loop about a central opening and the loop defines a convex turf contact surface on the distal end having a radius of curvature of at least 0.5 inches, wherein the wiper extends linearly from a first wiper end to a second wiper end and the wiper defines a plurality of slits through the distal end towards the proximal end, wherein the plurality of slits are spaced along the wiper in the longitudinal direction; and
    a fastening structure towards the proximal end of the wiper configured to be fastened to a working implement.

2. The apparatus of claim 1, wherein the fastening structure is configured to form a non-pivotable connection between the wiper and the working implement.

3. The apparatus of claim 1, wherein the wiper comprises an elongate sheet having a first elongate sheet end and a second elongate sheet end, wherein the elongate sheet forms a bend between the first elongate sheet end and the second elongate sheet end, and the bend defines the convex turf contact surface.

4. The apparatus of claim 3, wherein the wiper defines a closed loop.

5. The apparatus of claim 4, wherein the first elongate sheet end and the second elongate sheet end of the elongate sheet form the proximal end of the wiper.

6. The apparatus of claim 4, wherein the first elongate sheet end abuts the second elongate sheet end.

7. The apparatus of claim 1, wherein the plurality of slits are equally spaced in the longitudinal direction.

8. The apparatus of claim 7, wherein each slit within the plurality of slits is spaced at least 3 inches from adjacent slits within the plurality of slits.

9. The apparatus of claim 1, wherein the fastening structure comprises a plurality of fastener openings spaced across the proximal end of the wiper.

10. The apparatus of claim 9, further comprising a rigid attachment plate having plate openings configured to be longitudinally aligned with the fastener openings, wherein each of the plate openings have a vertical length that is greater than a vertical length of each of the plurality of fastener openings, whereby the rigid attachment plate is configured to be selectively linearly translated relative to the wiper from a first position to a second position.

11. The apparatus of claim 10, wherein the first position is configured to correspond to a first stiffness of the wiper and the second position is configured to correspond to a second stiffness of the wiper that is greater than the first stiffness.

12. A turf striping apparatus comprising:
    a wiper having a proximal end and a distal end, wherein the wiper defines an elongate loop about a central opening and the loop defines a convex turf contact surface on the distal end;
    a fastening structure towards the proximal end of the wiper configured to be fastened to a working implement, wherein the fastening structure comprises a plurality of fastener openings spaced across the proximal end of the wiper, wherein the turf striping apparatus defines a pivot axis in the longitudinal direction from a first wiper end to a second wiper end, wherein the length of the distal end of the wiper is configured to pivot about the pivot axis, and wherein the turf striping apparatus defines a biasing force opposing pivoting of the wiper about the pivot axis; and
    a rigid attachment plate having plate openings configured to be longitudinally aligned with the fastener openings, wherein each of the plate openings have a vertical length that is greater than a vertical length of each of the plurality of fastener openings, whereby the rigid attachment plate is configured to be selectively linearly translated relative to the wiper from a first position to a second position.

13. The apparatus of claim 12, wherein the fastening structure is configured to form a non-pivotable connection between the wiper and the working implement.

14. The apparatus of claim 12, wherein the wiper comprises an elongate sheet having a first elongate sheet end and a second elongate sheet end, wherein the elongate sheet forms a bend between the first elongate sheet end and the second elongate sheet end, and the bend defines the convex turf contact surface.

15. The apparatus of claim 12, wherein the convex turf contact surface has a radius of curvature of at least 0.5 inches.

16. The apparatus of claim 12, wherein the first position is configured to correspond to a first stiffness of the wiper and the second position is configured to correspond to a second stiffness of the wiper that is greater than the first stiffness.

\* \* \* \* \*